No. 718,761. PATENTED JAN. 20, 1903.
J. G. F. HIEBER.
SELF CLOSING VENT AND INDICATOR FOR STORAGE CASKS.
APPLICATION FILED JULY 21, 1902.
NO MODEL.
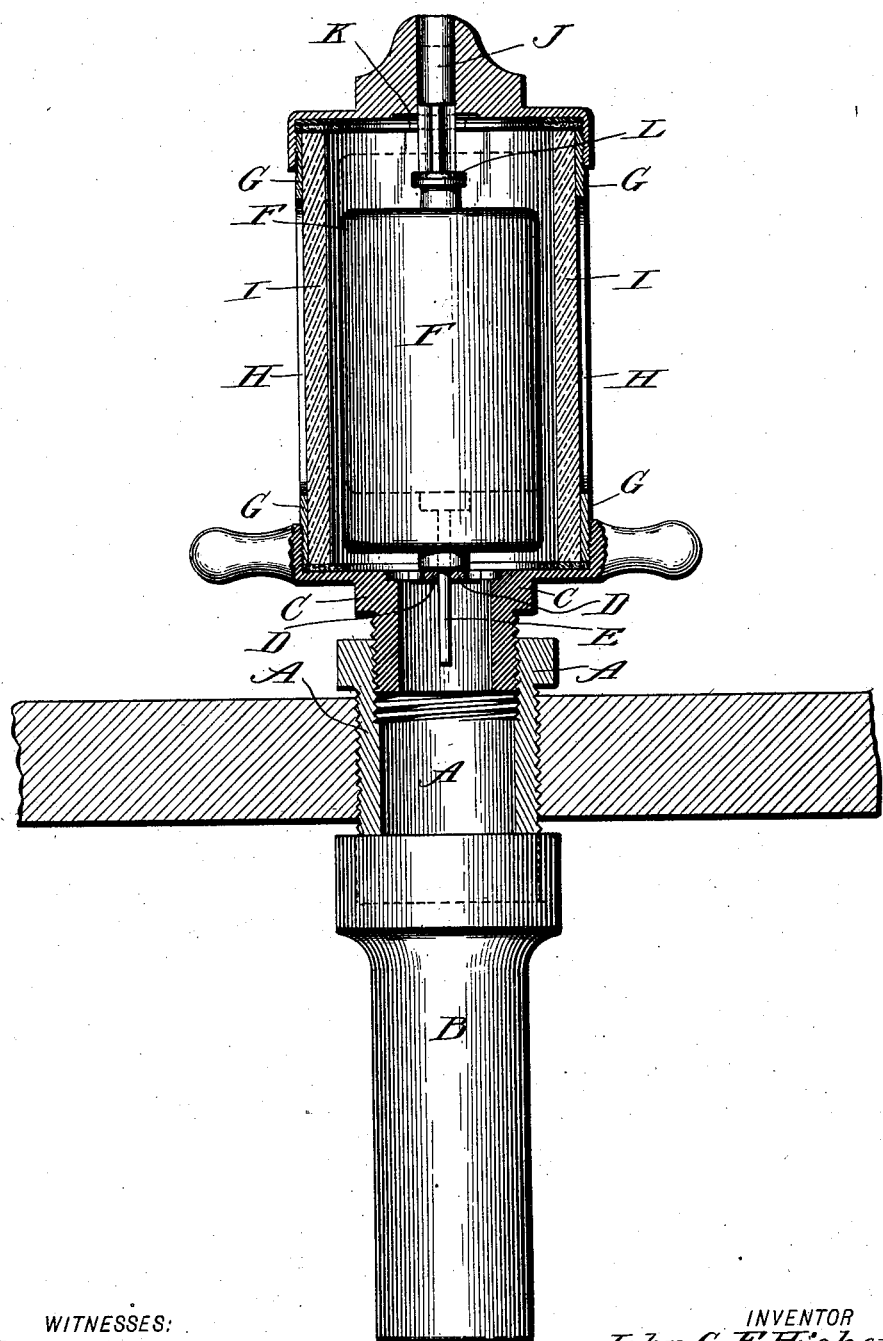
WITNESSES:
INVENTOR
John G. F. Hieber
BY Munn & Co.
ATTORNEYS.

UNITED STATES PATENT OFFICE.

JOHN G. F. HIEBER, OF SPOKANE, WASHINGTON.

SELF-CLOSING VENT AND INDICATOR FOR STORAGE-CASKS.

SPECIFICATION forming part of Letters Patent No. 718,761, dated January 20, 1903.

Application filed July 21, 1902. Serial No. 116,479. (No model.)

*To all whom it may concern:*

Be it known that I, JOHN G. F. HIEBER, a citizen of the United States, and a resident of Spokane, in the county of Spokane and State of Washington, have invented certain new and useful Improvements in Self-Closing Vents and Indicators for Storage-Casks, of which the following is a specification.

The object of my invention is to provide a combined indicator and self-closing or automatic air-vent for casks or vats employed in breweries for storing beer; and the invention consists in the special indicator and self-closing vent hereinafter fully described, with the novel features pointed out in the claim.

With the present means employed for storing beer in large casks or vats there is at times much loss, owing to overflow of beer at the air-vent, and such loss of beer is due to the fact that a man on watch at the bunghole when the desired measure of beer has passed into the cask or vat must go to the inlet, remotely situated, to stop the flow of beer, and while so doing, since it is desirable that a measured quantity of beer shall be in the casks or vat, overflow will take place with vents now used at the bung-hole. To obviate liability of the objectionable and expensive loss of beer incident to overflow at the cask-vent, as above stated, I have invented a combined self-closing valve and peculiar drop-tube, which will, in addition to automatically stopping all vent of air from the cask or vat, indicate proper working of the vent.

In order to enable others to make and use my invention, I will now proceed to describe it in detail, reference being had to the accompanying drawing, which forms a part of this specification, and in which is shown a central vertical section through my whole vent apparatus shown arranged in the bung-hole of a cask or vat, the latter being in sectional detail.

In carrying out my invention I employ a fixed bushing A, screwed or otherwise secured in the cask or vat and having threaded on its inner end a drop-tube B.

Storage or chip casks are as a rule filled to about four or eight inches from the top of the cask, according to circumstances well understood in the art. Now, as before stated, should the man stand by until the beer reaches the desired level in the cask before he can get to the inlet—that is, the valve controlling flow of beer—the cask will not only be overfilled before he can get to the inlet-valves, but, as often happens, overflow will take place and much beer run to waste. The drop-tube B being threaded upon the inner end of the bushing A, it is apparent that it can be adjusted in length according to the space desired to be left above the beer. The bushing A and the drop-tube B remain a fixture with the cask or vat. Within the bushing A is threaded a hollow socket C, having in its opening a spider D, adapted to guide a stem E on the lower side of a float F. G indicates a casing having sight-openings H in its side, and arranged within it is a glass cylinder I. The lower end of the casing G is screw-threaded, and the upper end of the socket C is internally threaded and adapted to receive the threaded end of the casing G, as shown. Each end of the glass cylinder I, arranged within the casing G, is provided with suitable packing to prevent leakage. The upper end of the said casing G is closed, as shown, to a reduced opening J, having at its lower end within the casing a valve-seat K, adapted to be closed by a valve L upon the upper side of the float F.

Now with all the parts in the make-up of my invention in position, as shown, it is apparent that when the beer is fed through a feed-pipe (not shown) and the level thereof reaches the lower end of the drop-tube B air will be compressed between the surface of the beer and the closed top of the cask or vat, effecting to force the beer up through the depending tube B, hollow socket C, and into the glass cylinder I. Upon continued flow of the beer into the cask and its passage upwardly into the cylinder I the float will be lifted until its valve is seated at K. With the outlet at K closed, as just described, it is apparent that beer can pass into the cask only so long as the force of its flow is greater than pressure exerted by the confined air above the beer.

Having stated that the depending tube B is adjustable—that is, it can be elongated by screwing it on or off the inner threaded end of the bushing A—it is apparent that the said drop-tube can be set so as to force beer up into the cylinder I and lift the float F, so that the valve L will close the outlet J, and thus prevent overflow, and also so as to insure that the desired space will be left in the cask or vat above the beer.

With the valve L seated as stated it is obvious that flow into the cask can be stopped at a predetermined time, and thus insure that the desired measure of beer will pass before its force of flow is overcome by the confined air in the cask explained above. The sight-openings H provide means whereby movement of the float F may be seen, and thus indicate to the attendant when the cask is filled and the valve about to be seated.

Having thus described my invention, what I claim as new, and desire to secure by Letters Patent, is—

In combination with a tank or cask, a bushing having an exterior screw-threaded portion with the latter adapted to extend through the side wall of a tank or cask and project suitably therein, an adjustable depending tube, having screw-threads at its upper inner end, supported by the inner end of the bushing, and a suitably-inclosed float-valve supported on the exterior portion of the said bushing, the float-valve closure, the bushing and the depending tube being arranged in substantially vertical alinement adapted with the float-valve at its lower or open position to afford free outlet from the tank or cask and when floated to its upper position close the outlet from the tank or cask substantially as described.

JOHN G. F. HIEBER.

Witnesses:
   CHAS. P. LUND,
   L. R. HAMBLEN.